(12) United States Patent
Zhang et al.

(10) Patent No.: US 9,958,587 B2
(45) Date of Patent: May 1, 2018

(54) LIGHT GUIDE PLATE, METHOD FOR FABRICATING THE SAME AND BACKLIGHT UNIT

(71) Applicants: BOE TECHNOLOGY GROUP CO., LTD., Beijing (CN); BEIJING BOE DISPLAY TECHNOLOGY CO., LTD., Beijing (CN)

(72) Inventors: Zhidan Zhang, Beijing (CN); Hongli Zhu, Beijing (CN); Daekeun Yoon, Beijing (CN); Qing Ma, Beijing (CN); Hai Chi, Beijing (CN); You Li, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 507 days.

(21) Appl. No.: 13/943,977

(22) Filed: Jul. 17, 2013

(65) Prior Publication Data
US 2014/0078779 A1 Mar. 20, 2014

(30) Foreign Application Priority Data
Sep. 14, 2012 (CN) .......................... 2012 1 0343043

(51) Int. Cl.
*F21V 8/00* (2006.01)

(52) U.S. Cl.
CPC ......... *G02B 6/0015* (2013.01); *G02B 6/0016* (2013.01); *G02B 6/0018* (2013.01); *G02B 6/0065* (2013.01)

(58) Field of Classification Search
None
See application file for complete search history.

(56) References Cited

U.S. PATENT DOCUMENTS

| | | | | |
|---|---|---|---|---|
| 2001/0019379 A1* | 9/2001 | Ishihara | ............... | G02B 6/0018 349/65 |
| 2002/0054488 A1* | 5/2002 | Ohkawa | ............... | G02B 6/0018 362/613 |
| 2003/0076669 A1* | 4/2003 | Itoh | ...................... | G02B 6/0016 362/621 |
| 2007/0002567 A1* | 1/2007 | Herloski | ............... | G02B 6/0021 362/307 |
| 2010/0062272 A1 | 3/2010 | Wursche et al. | | |

(Continued)

FOREIGN PATENT DOCUMENTS

| | | |
|---|---|---|
| CN | 1982984 A | 6/2007 |
| WO | 2008065906 A1 | 5/2008 |

OTHER PUBLICATIONS

Extended European Search Report dated Feb. 10, 2014 Appln. No. EP 13 18 1123.

(Continued)

*Primary Examiner* — Chad H Smith
(74) *Attorney, Agent, or Firm* — Ladas & Parry LLP; Loren K. Thompson

(57) ABSTRACT

Embodiments of the invention relate to a light guide plate, a method for fabricating the same and a backlight unit. The light guide plate comprises a low density region and a plurality of high density regions, wherein the plurality of high density regions are separately disposed on a light incident side of the light guide plate.

9 Claims, 2 Drawing Sheets

(56) References Cited

U.S. PATENT DOCUMENTS

| | | | |
|---|---|---|---|
| 2012/0026430 A1* | 2/2012 | Chen | G02B 6/0016 349/65 |
| 2012/0313045 A1* | 12/2012 | Shim | C09D 7/1275 252/301.36 |
| 2014/0071653 A1* | 3/2014 | Thompson | G02B 6/005 362/19 |

OTHER PUBLICATIONS

First Chinese Office Action dated Jun. 4, 2013 Appln. No. 201210343043.0.
Second Chinese Office Action dated Jan. 9, 2013 Appln. No. 201210343043.0.

* cited by examiner

LIGHT GUIDE PLATE, METHOD FOR FABRICATING THE SAME AND BACKLIGHT UNIT

FIELD OF THE ART

Embodiments of the invention relate to a light guide plate, a method for fabricating the same and a backlight unit.

BACKGROUND

A backlight unit is for providing a light source for display devices such as Liquid Crystal Displays (LCDs). As a LCD does not emit light itself, a light guide plate (LGP) is an important component of the backlight unit and functions to transform a line light source to a surface light source.

Conventional LGPs are made of materials such as Polymethylmethacrylate (PMMA), Polycarbonate (PC), Styrene methyl methacrylate (MS) resin and Polystyrene (PS). The physical property, specifically the density and melting point, of the materials are respectively: PMMA, 1.15 g/cm$^3$ and 160° C.; PC, 1.22 g/cm$^3$ and 220° C.; MS, 1.12 g/cm$^3$ and 160° C.; PS, 1.05 g/cm$^3$ and 180° C. A convention edge-lit LGP 01 has a working state as illustrated in FIG. 1, in which a plurality of Light Emitting Diode (LED) 02 functions as the light source. Due to the limitation of the emission angle (a normal LED has an emission angle of about 120°), a triangular dark region 03 exists between two neighboring LEDs in which no light can reach. If the brightness of the dark region is too low, hotspots will occur, which would affect the picture quality.

The currently available solutions for the hotspot issue have obvious disadvantages. For example, a pitch between two neighboring LEDs may be adjusted by design to decrease the dark region. However, more LEDs will be needed when the distance between LEDs is decreased, which will increase the cost. The hotspot phenomenon may be alleviated by adjusting the brightness of the dark region through designing the pattern of the LGP, which can mitigate the hotspot but is difficult to realize. The hotspot phenomenon may also be solved by replacing the existing film material with a better film material, which will increase the cost.

SUMMARY

Embodiments of the invention provide a LGP as well as its fabrication method and application, with an aim of solving the hotspot phenomenon caused by the triangular dark region on the LGP of an edge-lit light source.

A first aspect of the invention relates to a light guide plate comprising: a low density region and a plurality of high density regions, the plurality of high density regions are separately disposed on a light incident side of the light guide plate.

As an example, the high density regions are located in a region of the light guide plate corresponding to a region between two separate neighboring dot light sources, when a plurality of separate dot light sources are used as a side light source.

As an example, the high density regions are located in a triangular dark region on the LGP generated by two neighboring separate light sources. An area of the high density regions is determined by the following equation:

$$\frac{1}{4}(P-L)^2\tan\left(90° - \frac{r}{2}\right) - S(P-L) + S^2\tan\frac{r}{2},$$

where L is a length of a dot light source, P is a pitch between two neighboring dot light sources, S is a distance between a light emission side of a dot light source to the light incident side of the light guide plate, r is an emission angle of the dot light source; 0.1 mm≤S≤0.3 mm.

As an example, the high density regions are made of polymethylmethacrylate or polycarbonate or styrene methyl methacrylate resin, the low density region is made of polymethylmethacrylate or styrene methyl methacrylate resin or polystyrene; a density of the high density regions is larger than that of the low density region.

As an example, the high density regions are made of polycarbonate and the low density is made of polymethylmethacrylate.

A second aspect of the invention relates to an injection molding method for fabricating a light guide plate having regions of different densities, wherein a mold used in a low density region by the method is configured as a core-pulling mold.

As an example, the method comprises the following steps:
injecting a high density material in a first injection molding machine and forming a semi-finished molded part; and
transferring the semi-finished molded part to an injection unit of a second injection molding machine, pulling the core-pulling mold out, and injecting a low density material in the original core-pulling mold region.

As an example, the method comprises the following steps:
injecting a high density material in an injection molding machine and forming a semi-finished molded part; and
rotating the mold by 180°, pulling the core-pulling mold out, and injecting a low density material.

In the above method, a mold temperature for molding the light guide plate is 75☐~95☐, preferably 90☐; a melt temperature for molding the light guide plate is 210☐~250☐, preferably 230☐; an injection speed for molding the light guide plate is 6 mm/sec~300 mm/sec, preferably 100 mm/sec; a pressure for molding the light guide plate is 80% of an injection pressure, a pressure time for molding the light guide plate is 1 second~20 seconds, preferably 4 seconds.

A third aspect of the invention relates to a backlight unit comprising the above light guide plate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

01. LGP; 02. LED; 03. triangular dark region; 2. LED; 4. low-density region; 5. high-density region; 6. a region of LGP corresponding to the region between two neighboring LEDs; 7. high-density material injection region.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
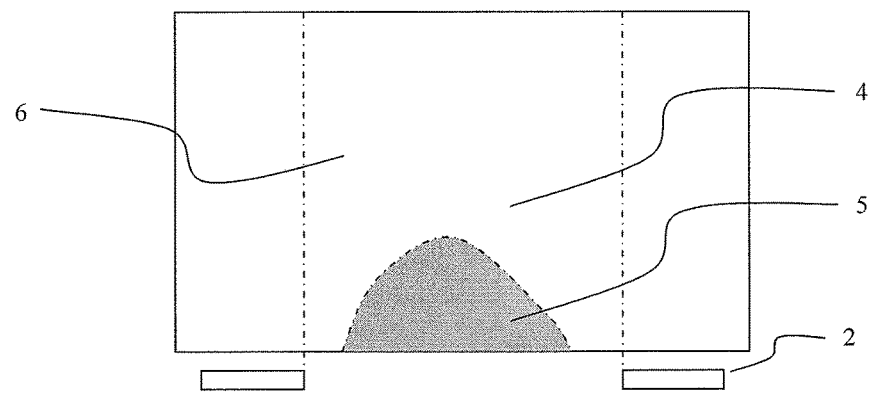
FIG. 2 schematically illustrates a configuration of a LGP in accordance with an embodiment of the invention.

As illustrated in FIG. 2, the low density region 4 and the high density region 5 as recited in the invention are relative concepts. The so-called low density region is a region having a relatively lower density as opposed to the high density region of the LGP. The so-called high density region is a region having a relatively high density as opposed to the low density region of the LGP.

Figure 1:
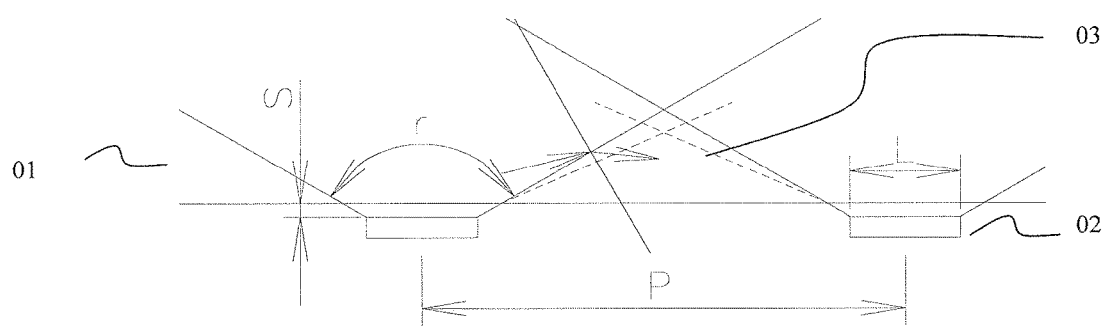
FIG. 1 schematically illustrates a working state of a conventional LGP.

The triangular dark region between two neighboring separate dot light sources as recited by the invention refers to a triangular region between the two separate dot light sources where no light can reach due to the limitation of the emission angles of the dot light sources. The boundary of the region is delimited by the emission angle boundary of the two separate dot light sources. As illustrated in FIG. 1, the triangular region delimited by two solidlines (two beams emitted by the two neighboring LEDs 02) and the edge of the LGP is the triangular dark region 03 of the conventional LGP. Depending on the models of display devices, the models, geometrical size, and the number of dot light sources (such as LED), and the size of LGP, the pitch between the dot light sources and the distance between the light emission surface of the dot light sources and the light incident surface of the LGP are different in different dot light sources. The equation for calculating the dark region is defined in the invention. As illustrated in FIG. 1, it is assumed that a length of a dot light source is L, a distance between the light emission surface of the dot light source and the light incident side of the LGP is S (0.1 mm≤S≤0.3 mm), the pitch between the dot light sources is P, and the emission angle of the dot light source is r.

The area of the dark region is calculated in accordance with the following equation:

$$\frac{1}{4}(P-L)^2\tan\left(90°-\frac{r}{2}\right)-S(P-L)+S^2\tan\frac{r}{2}$$

A region of LGP corresponding to the region between two neighboring separate dot light sources as recited by the invention is indicated by the numeral 6 of FIG. 2, that is, a region on the LGP that is delimited by straight lines drawn from the nearer ends of the two neighboring separate dot light sources, and vertical to the light emission surface of the separate dot light sources (when the light emission surface of the separate dot light source is a plane) or vertical to the tangent line of the light emission surface of the separate dot light sources (when the light emission surface of the separate dot light source is a curved surface). In short, it is a region of the LGP that is in between the projection regions of the two separate dot light sources on the LGP.

An embodiment of the invention relates to a LGP comprising a low density region and a plurality of high density regions, the plurality of high density regions are separately arranged on a light incident side of the LGP. As an example, when several separate dot light sources are used as the edge light source, the high density region is located in the region of LGP corresponding to the region between two neighboring separate dot light sources. Preferably, it is located in for example the triangular dark region generated on the LGP by the two neighboring separate dot light sources. In this case, the area of the high density region is determined as follows:

$$\frac{1}{4}(P-L)^2\tan\left(90°-\frac{r}{2}\right)-S(P-L)+S^2\tan\frac{r}{2},$$

where L is the length of the dot light source, P is the pitch between the two neighboring dot light sources; S is a distance between the light emission surface of the dot light source and the light incident side of the LGP, and r is the emission angle of the dot light sources. Preferably, 0.1 mm≤S≤0.3 mm.

The high density region is injection molded for example using PMMA or PC or MS; the low density region is injection molded for example using PMMA or MS or PS. The density of the high density region is larger than that of the low density region.

Preferably, the high density region is injection molded using PC, the low density region is injection molded using PMMA. In this case, it may achieve the best enhancement effect on the brightness of the triangular dark region.

Another embodiment of the invention relates to an injection molding method for fabricating a LGP having regions of different densities. One of the differences between the above method and the conventional injection molding method for fabricating the LGP is that a mold used in the low density region by the method is configured as a core-pulling mold.

As an example, the injection molding method may comprise the following steps:

injecting a high density material in a first injection molding machine and forming a semi-finished molded part; and transferring the semi-finished molded part to an injection unit of a second injection molding machine, pulling a core-pulling mold out, and injecting a low density material in the original core-pulling mold region.

As another example, the injection molding method may comprise the following steps:

injecting a high density material in an injection molding machine and forming a semi-finished molded part; and rotating the mold by 180°, pulling a core-pulling mold out, and injecting a low density material.

In the above method, the temperature of the mold for molding the LGP is 75° C.~95° C., preferably 90° C.; the melt temperature for molding the LGP is 210° C.~250° C., preferably 230° C.; the injection speed for molding the LGP is 6 mm/sec~300 mm/sec, preferably 100 mm/s; the pressure for molding the LGP is 80% of the injection pressure, the pressure time for molding the LGP is 1 second~20 seconds, preferably 4 seconds.

Another embodiment of the invention relates to a backlight unit comprising any of the above LOP.

Another embodiment of the invention relates to a display device comprising the above backlight unit.

As the LGP provided by the embodiment of the invention has regions of different densities, the LGP of the triangular dark region between two neighboring dot light sources has a higher density than other regions. When the light from the dot light source enters the high density region from the low density region the light is refracted and turned to the triangular dark region. As a result, more light enters the triangular region and the brightness of the triangular dark region is enhanced, thereby solving the problems of having hotspot and uneven brightness and meeting the requirement of uniform light-mixing on the light-incident side. Increasing the density in the triangular dark region will not negatively affect the light efficiency of the dot light sources.

In the following, the LGP as well as the method and the application of the same will be described in detail with reference to examples. However, the invention is not limited to the following examples.

The high density region of the invention is injection molded using PMMA or PC or MS; the low density region is injection molded using PMMA or MS or PS. In the following examples, a high density region injection molded using PC and a low density region injection molded using PMMA will be used to be described as the examples.

EXAMPLE 1

The LGP of the example comprises a low density region and a plurality of high density region. A material of the low density region is PMMA and that of the high density region is PC, the two regions are injected through different injection gate. When injection is performed, both materials are in liquid state and have high temperatures, thus the two materials can be easily combined under liquid state.

In the example, the LGP is fabricated by using injection molding.

The example makes use of two injection molding machines and injection is accomplished by transferring the mold.

Figure 3:
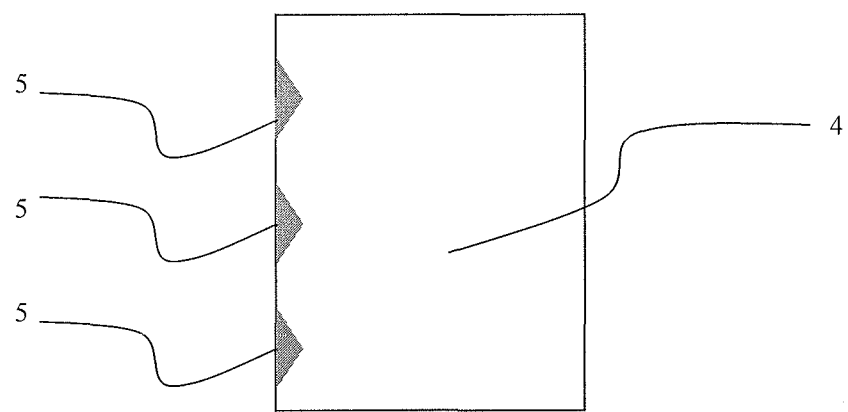
FIG. 3 schematically illustrates a preferable configuration of a LGP in accordance with an embodiment of the invention.

With reference to FIG. 3, the high density region 5 is PC injection molded region and the low density region 4 is configured with a core-pulling mold.

First, g a high density material is injected into a first injection molding machine and a semi-finished molded part is formed.

Next, a manipulator is used to transfer the semi-finished molded part to an injection unit of a second injection molding machine and to pull the core-pulling mold out. In the original core-pulling mold region, the second injection molding machine injects the low density material PMMA, thereby forming the injection molding of the semi-finished LGP.

After being molded, the semi-finished part is ejected from the PC end and redundant material in the PC region is cut off to form a final part as illustrated in FIG. 3.

Using the core-pulling mold provides the possibility of improving the process efficiency. The difference between this mold and other molds is that the final part and the semi-finished part are formed in the same mold cavity. When the core of the mold is pulled out, the cavity for the final part is increased, providing space for the injection of the second material. A seal slide may separate the mold cavity (partitioner slide), and then forms an integral mold cavity. In comparison with other molds, the core-pulling mold works according to a set sequence, thus the rapid injection of the second material increases the adhesion strength. The central location of the cavity also minimizes the required clamp force.

Those skilled in the art can easily realize the present invention by referring to the steps described in the invention in connection with the prior art LGP injection molding process. Here, injection parameters are mainly as follows:

(1) Mold Temperature

The mold temperature will affect the mold cycle and the mold quality. In practical operations, the mold temperature is appropriately set from the lowest temperature of the product material and then increased properly according to the quality condition. In designing the mold and setting the molding process conditions, it is important not only to maintain a suitable temperature but also to make the temperature to distribute evenly. An uneven temperature will lead to uneven shrinkage and internal stress, thereby making the final part easily deformable and warping. A suitable temperature for molding the LGP of the invention is 90° C.

(2) Melt Temperature

For injection molding, the melt temperature is set to 210° C.~250° C., warpage is minimized at 230□ and will be increased for both too high and too low temperatures, thus 230□ is an optimal temperature. Moreover, with the same filling time, a higher melt temperature causes a thinner solidified layer than the lower melt temperature and thus the shrinkage of the final product is increased accordingly.

(3) Injection Speed

The warping deformation of the LGP may be decreased by increasing the injection speed which is beneficial to the overall performance of the final product. However, too high an injection speed may increase the pressure loss and cause strong melt shear that leads to burning. The optimal value for the parameter is 100 mm$^3$/s.

(4) Holding Pressure

The warpage of the LGP is increased with the increase of the holding pressure. Though a high holding pressure may increase the density of the molded part, decrease the shrinkage marks of the molded part and prevent backflow of the material, it may increase anisotropy of the product, prolong the cooling time and increase die adhesion, which can easily deform the molded part, produce surface scratch and flash, all of which negatively affect the surface quality. An appropriate holding pressure of molding the LGP is 80% of the injection pressure.

(5) Pressure Time

A suitable pressure time can help reducing the shrinkage of the final part. However, too long a pressure time will dramatically increase the internal stress of the final part. A final product of the LGP has substantially finished pressure holding and shrinkage compensation at 4 second. If packing is continued and the internal stress of the final product is increased, the warpage deformation will be increased. However, too short a pressure time will lead to untimely compensation for the shrinkage, thereby causing defects such as sink marks, and insufficient compensation. An optimal pressure time is 4 seconds.

(6) Cooling Time and Cooling Circuit

Cooling has a significant effect on the warping of the final part. A cooling circuit with proper layout may help to produce product of excellent quality. In accordance with analysis, an optimal cooling time is 35 seconds. Cooling time being too short may cause large shrinkage. For the product under discussion, it makes a contribution of 2.6% and is a minor factor. An appropriate cooling circuit for LGP molding is a dual circuit cooling system along the longitude direction of the LGP.

EXAMPLE 2

The LGP of the example comprises a low density region and a plurality of high density region. A material of the low density region is PMMA and that of the high density region is PC, the two regions are injected through different injection gates. When injection is performed, both materials are in liquid state and have high temperatures, thus the two materials can be easily combined under liquid state.

In the example, the LGP is fabricated by using injection molding.

Figure 4:
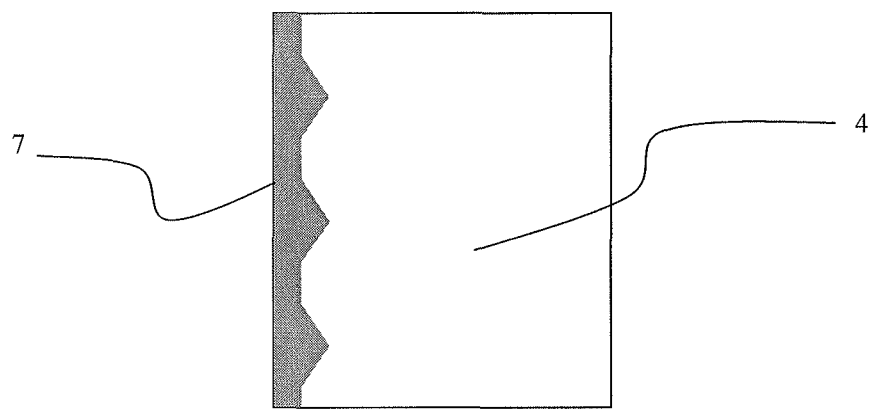
FIG. 4 schematically illustrates a configuration of a semi-finished LGP fabricated in accordance with an embodiment of the invention.

With reference to FIG. 4, the high density region 7 is PC injection region and the low density region 4 is configured with a core-pulling mold.

First, a high density PC material is injected into an injection molding machine and a semi-finished molded part is formed.

Next, the mold is rotated by 180° and the core-pulling mold is pulled out. The injection gate for the low density material PMMA is aligned with the injection gate of PC, and PMMA is injected, thereby forming the injection molding of the semi-finished LGP.

After being molded, the semi-finished part is ejected from the PC end and redundant material in the PC region is cut away to form a final product as illustrated in FIG. 3.

Using the core-pulling mold provides the possibility of improving the process efficiency. The difference between this mold and other molds is that the final part and the semi-finished part are formed in the same mold cavity. When the core of the mold is pulled out, the cavity for the final part is increased, providing space for the injection of the second material. A seal slide may separate the mold cavity (partitioner slide), and then forms an integral mold cavity. In comparison with other molds, the core-pulling mold works according to a set sequence, thus the rapid injection of the second material increases the adhesion strength. The central location of the cavity also minimizes the required clamp forces.

Those skilled in the art can easily realize the present invention by referring to the steps described in the invention in connection with the prior art LGP injection molding process. Here, injection parameters are mainly as follows:

(1) Mold Temperature

The mold temperature will affect the mold cycle and the mold quality. In practical operations, the mold temperature is appropriately set from the lowest temperature of the product material and then increased properly according to the quality condition. In designing the mold and setting the molding process conditions, it is important not only to maintain a suitable temperature but also to make the temperature to distribute evenly. An uneven temperature will lead to uneven shrinkage and internal stress, thereby making the final part easily deformable and warping. A suitable temperature for molding the LGP of the invention is 90° C.

(2) Melt Temperature

For injection molding, the melt temperature is set to 210° C.~250° C., warpage is minimized at 230□ and will be increased for both too high and too low temperatures, thus 230□ is an optimal temperature. Moreover, with the same filling time, a higher melt temperature causes a thinner solidified layer than the lower melt temperature and thus the shrinkage of the final product is increased accordingly.

(3) Injection Speed

The warping deformation of the LGP may be decreased by increasing the injection speed which is beneficial to the overall performance of the final product. However, too high an injection speed may increase the pressure loss and cause strong melt shear that leads to burning. The optimal value for the parameter is 100 mm³/s.

(4) Holding Pressure

The warpage of the LGP is increased with the increase of the holding pressure. Though a high holding pressure may increase the density of the molded part, decrease the shrinkage marks of the molded part and prevent backflow of the material, it may increase anisotropy of the product, prolong the cooling time and increase die adhesion, which can easily deform the molded part, produce surface scratch and flash, all of which negatively affect the surface quality. An appropriate holding pressure of molding the LGP is 80% of the injection pressure.

(5) Pressure Time

A suitable pressure time can help reducing the shrinkage of the final part. However, too long a pressure time will dramatically increase the internal stress of the final part. A final product of the LGP has substantially finished pressure holding and shrinkage compensation at 4 seconds. If packing is continued and the internal stress of the final product is increased, the warpage deformation will be increased. However, too short a pressure time will lead to untimely compensation for the shrinkage, thereby causing defects such as sink marks, and insufficient compensation. An optimal pressure time is 4 seconds.

(6) Cooling Time and Cooling Circuit

Cooling has a significant effect on the warping of the final part. A cooling circuit with proper layout may help to produce product of excellent quality. In accordance with analysis, an optimal cooling time is 35 seconds. Cooling time being too short may cause large shrinkage. For the product under discussion, it makes a contribution of 2.6% and is a minor factor. An appropriate cooling circuit for LGP molding is a dual circuit cooling system along the longitude direction of the LGP.

EXAMPLE 3

Comparison of Improvement Effects for the Triangular Dark Region with High Density Region in Different Ranges In the case of using several separate LED light sources as the edge light source, the inventors has the following discovery, when the range of the high density region in the region between two neighboring separate LED light sources are adjusted, the improvement effect for the triangular dark region is maximized when the high density region exactly occupies the triangular dark region of the two neighboring LED light sources, and no loss will be exerted on the LED light efficiency.

EXAMPLE 4

Selection of Different Injection Materials

Through experiments on combining different injecting materials, the inventors found that PMMA and PC is the best combination. Such a combination may produce a LGP with little distortion, clear compound surface, difficult to break and good attachment compatibility.

By applying LGPs with different density regions, a method for reducing hotspot is provided.

The performance of the LGP may be further optimized by combining the technical solution of designing the LGP as having regions of different densities provided by the invention and other technical means for optimizing the performance of the LGP. As an example, when designing the LGP as having regions of different densities, if the light incident side of the LGP, especially regions of the light incident side that are faced with the LED light sources, is designed as being a concave structure, the light guide performance of the LGP may be significantly improved.

Another example of the invention further provides a backlight unit comprising the above LGP. Still another example of the invention further provides a display device comprising the above backlight unit. The display device may be a LCD panel, an E-paper, an OLED panel, a mobile phone, a tablet PC, a television, a monitor, a laptop, a digital photoframe, a navigation device and any other product or component having a display function.

What are described above is related to the illustrative embodiments of the disclosure only and not limitative to the scope of the disclosure; the scopes of the disclosure are defined by the accompanying claims.

What is claimed is:

1. A light guide plate, comprising: a low density region and a plurality of high density regions, the plurality of high density regions are disposed on a light incident side of the light guide plate and the plurality of high density regions are disposed separately from one another, the low density region is in contact with each of the plurality of high density regions, each of the plurality of high density regions forms a portion of a light incident surface of the light incident side of the light guide plate and has a tapered shape, and each of the plurality of high density regions is on the light incident surface,
wherein the high density regions are made of polymethylmethacrylate or polycarbonate or styrene methyl methacrylate resin, the low density region is made of polymethylmethacrylate or styrene methyl methacrylate resin or polystyrene, wherein the low density region is a region having a lower material density as compared to the high density regions, wherein the material density is defined as its mass or weight per unit volume, wherein the high density regions are located in a region of the light guide plate corresponding to a region between two separate neighboring dot light sources, when a plurality of separate dot light sources are used as a side light source, wherein the high density regions are located in a triangular dark region on the light guide plate generated by two neighboring separate dot light sources.

2. The light guide plate of claim 1, wherein an area of the high density regions is determined by the following equation: an area of a high density region=

$$\frac{1}{4}(P-L)^2\tan\left(90°-\frac{r}{2}\right)-S(P-L)+S^2\tan\frac{r}{2},$$

where L is a length of a dot light source, P is a pitch between two neighboring dot light sources, S is a distance between a light emission side of a dot light source to the light incident side of the light guide plate, r is an emission angle of the dot light source; 0.1 mm≤S≤0.3 mm.

3. The light guide plate of claim 1, wherein the high density regions are made of polycarbonate and the low density is made of polymethylmethacrylate.

4. A backlight unit comprising the light guide plate in accordance with claim 1.

5. An injection molding method for fabricating a light guide plate having regions of different material densities, wherein the regions of different material densities comprises a low density region and a plurality of high density regions, the low density region is in contact with each of the plurality of high density regions, the plurality of high density regions are disposed separately from one another, each of the plurality of high density regions forms a portion of a light incident surface of a light incident side of the light guide plate and has a tapered, and each of the plurality of high density regions is on the light incident surface, wherein a mold used in the low density region by the method is configured as a core-pulling mold , wherein the high density regions are made of polymethylmethacrylate or polycarbonate or styrene methyl methacrylate resin, the low density region is made of polymethylmethacrylate or styrene methyl methacrylate resin or polystyrene, wherein the material density is defined as its mass or weight per unit volume, wherein the high density regions are located in a region of the light guide plate corresponding to a region between two separate neighboring dot light sources, when a plurality of separate dot light sources are used as a side light source, wherein the high density regions are located in a triangular dark region on the light guide plate generated by two neighboring separate dot light sources.

6. The method of claim 5, wherein the method comprises the following steps:
injecting a high density material in a first injection molding machine and forming a semi-finished molded part; and
transferring the semi-finished molded part to an injection unit of a second injection molding machine, pulling the core-pulling mold out, and injecting a low density material in an original core-pulling mold region.

7. The method of claim 5, wherein the method comprises the following steps:
injecting a high density material in an injection molding machine and forming a semi-finished molded part; and
rotating the mold by 180°, pulling the core-pulling mold out, and injecting a low density material.

8. The method of claim 5, wherein a mold temperature for molding the light guide plate is 75° C.~95° C., a melt temperature for molding the light guide plate is 210° C.~250° C., an injection speed for molding the light guide plate is 6 mm/sec~300 mm/sec, a pressure for molding the light guide plate is 80% of an injection pressure, a pressure time for molding the light guide plate is 1 second~20 seconds.

9. The method of claim 8, wherein the mold temperature for molding the light guide plate is 90° C., the melt temperature for molding the light guide plate is 230° C., the injection speed for molding the light guide plate is 100 mm/sec, the pressure for molding the light guide plate is 80% of an injection pressure, the pressure time for molding the light guide plate is 4 seconds.

* * * * *